(12) United States Patent
Oikawa (10) Patent No.: US 11,215,106 B2
(45) Date of Patent: Jan. 4, 2022

(54) COOLING DEVICE

(71) Applicant: SUBARU CORPORATION, Tokyo (JP)

(72) Inventor: Takeshi Oikawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/939,450

(22) Filed: Jul. 27, 2020

(65) Prior Publication Data
US 2021/0062706 A1 Mar. 4, 2021

(30) Foreign Application Priority Data

Aug. 27, 2019 (JP) .............................. JP2019-154746

(51) Int. Cl.
| | |
|---|---|
| *F01P 1/06* | (2006.01) |
| *F02B 77/11* | (2006.01) |
| *F02M 35/10* | (2006.01) |
| *B60K 11/08* | (2006.01) |
| *B60K 11/06* | (2006.01) |

(52) U.S. Cl.
CPC ............... *F01P 1/06* (2013.01); *B60K 11/06* (2013.01); *B60K 11/08* (2013.01); *F02M 35/10078* (2013.01); *F02M 35/10209* (2013.01); *F02M 35/10255* (2013.01); *F02M 35/10288* (2013.01)

(58) Field of Classification Search
CPC .................................. F02B 77/13; F02B 77/11
See application file for complete search history.

(56) References Cited

U.S. PATENT DOCUMENTS

| | | | | |
|---|---|---|---|---|
| 4,114,714 A | * | 9/1978 | Fachbach ............... | B60K 11/00 180/68.1 |
| 4,141,334 A | * | 2/1979 | Hatz ....................... | F01P 11/12 123/198 E |
| 4,141,427 A | * | 2/1979 | Kirchweger ........ | B60R 13/0838 180/69.22 |
| 4,164,262 A | * | 8/1979 | Skatsche ................ | B60K 11/04 123/195 C |
| 4,610,326 A | * | 9/1986 | Kirchweger ........... | B60K 11/08 123/41.62 |
| 5,269,264 A | * | 12/1993 | Weinhold ............. | B60K 11/085 123/198 E |
| 10,214,159 B1 | * | 2/2019 | An ....................... | B60R 13/0838 |
| 10,688,844 B2 | * | 6/2020 | Tanaka ................... | B60K 11/06 |

(Continued)

FOREIGN PATENT DOCUMENTS

JP 2013-119384 A 6/2013

*Primary Examiner* — Long T Tran (74) *Attorney, Agent, or Firm* — Troutman Pepper Hamilton Sanders LLP (57) ABSTRACT

A cooling device includes a surrounding member, an air inlet, an air outlet, and a flow-path-formation mechanism. The surrounding member is configured to surround an engine. The air inlet is formed in the surrounding member. The air outlet is formed in the surrounding member and is to be coupled to an intake pipe of the engine. The flow-path-formation mechanism is configured to form a flow path that allows outside air to circulate to the air outlet from the air inlet when a temperature of the engine or a temperature inside the surrounding member is greater than or equal to a predetermined temperature.

3 Claims, 4 Drawing Sheets

(56) References Cited

U.S. PATENT DOCUMENTS

| | | | |
|---|---|---|---|
| 2007/0113817 A1* | 5/2007 | Awata | B60K 13/02 123/184.57 |
| 2007/0295553 A1* | 12/2007 | Ochi | F02M 35/1294 181/18 |
| 2013/0146376 A1 | 6/2013 | Nam et al. | |
| 2017/0284275 A1* | 10/2017 | Nam | F01P 7/10 |

* cited by examiner

COOLING DEVICE

CROSS-REFERENCE TO RELATED APPLICATIONS

The present application claims priority from Japanese Patent Application No. 2019-154746 filed on Aug. 27, 2019, the entire contents of which are hereby incorporated by reference.

BACKGROUND

The disclosure relates to a cooling device that cools an engine.

In recent years, in order to reduce noise that is produced by an engine, a technology of causing an engine to be surrounded by a capsule formed from a sound-absorbing material has been developed (for instance, Japanese Unexamined Patent Application Publication (JP-A) No. 2013-119384. However, when the engine is surrounded by the capsule, the likelihood of heat of the engine being discharged decreases.

Therefore, in the technology in JP-A No. 2013-119384, an outside-air inlet formed in a front surface of the capsule and an active air flap used for opening and closing the inlet are provided. The active air flap is controlled to close the inlet at the time of initial starting or during a key-off operation, and to open the inlet while a vehicle is travelling. While the vehicle is travelling, the inside of the capsule (the engine) is cooled by outside air.

SUMMARY

An aspect of the disclosure provides a cooling device including a surrounding member, an air inlet, an air outlet, and a flow-path-formation mechanism. The surrounding member is configured to surround an engine. The air inlet is formed in the surrounding member. The air outlet is formed in the surrounding member and is to be coupled to an intake pipe of the engine. The flow-path-formation mechanism is configured to form a flow path that allows outside air to circulate to the air outlet from the air inlet when a temperature of the engine or a temperature inside the surrounding member is greater than or equal to a predetermined temperature.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

In the technology in JP-A No. 2013-119384, if the vehicle is not travelling, outside air may not be introduced into the capsule. Therefore, in an idling state in which the vehicle is not travelling, outside air may not be introduced into the capsule, as a result of which it may not be possible to cool the engine.

Therefore, a technology that makes it possible to cool an engine even in the idling state is desired.

It is desirable to provide a cooling device that makes it possible to cool an engine even in an idling state.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Engine System 100

Figure 1:
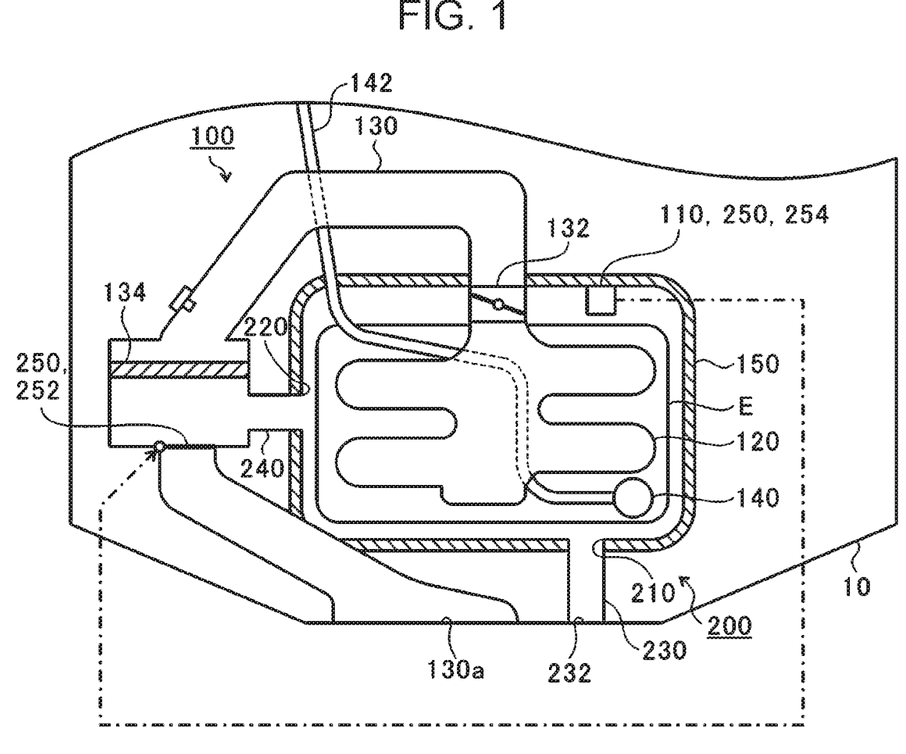
FIG. 1 illustrates an engine system according to an embodiment.

FIG. 1 illustrates an engine system 100 according to the embodiment. In FIG. 1, a signal flow is indicated by an alternate long and short dashed arrow. As illustrated in FIG. 1, the engine system 100 is installed in a vehicle 10. The engine system 100 includes an engine control unit (ECU) 110 that is a microcomputer including, for instance, a central processing unit (CPU), ROM in which a program or the like is stored, and RAM serving as a work area. The ECU 110 performs centralized control on an entire engine E. However, structures and processing operations related to the embodiment are described in detail below, and structures and processing operations that are unrelated to the embodiment are not described below.

The engine E that constitutes the engine system 100 includes an intake manifold 120 coupled to an intake port that communicates with a combustion chamber. The intake manifold 120 communicates with an intake pipe 130. An outside-air inlet 130a of the intake pipe 130 opens at a front side of the vehicle 10.

A throttle valve 132 and an air cleaner 134 on an upstream side with respect to the throttle valve 132 are provided in the intake pipe 130. The throttle valve 132 is opened and closed by being driven by an actuator in accordance with the opening degree of an accelerator (not illustrated). Air cleaned by the air cleaner 134 is sucked into the combustion chamber via the intake pipe 130 and the intake manifold 120.

The engine E includes a fuel pump 140 that supplies fuel to the combustion chamber. A fuel hose 142 couples the fuel pump 140 and a fuel tank.

In order to reduce noise and vibration that is produced by the engine E, the engine E is surrounded by a surrounding member 150 (a capsule). In addition to the engine E, the ECU 110, the fuel pump 140, and a portion of the fuel hose 142 are accommodated in the surrounding member 150. The surrounding member 150 is formed from a sound-absorbing material. The sound-absorbing material has a heat insulation function. A structure including the surrounding member 150 allows the engine system 100 to perform an early warming-up operation.

However, as the driving time of the engine E is increased, heat accumulates in the surrounding member 150, and the engine E may become excessively hot. This may cause the components constituting the engine E to deteriorate or become damaged.

When the inside of the surrounding member 150 becomes excessively hot, fuel in the portion of the fuel hose 142 and the fuel pump 140 that are accommodated in the surrounding member 150 evaporates. When the fuel contains a large quantity of air bubbles, the air bubbles are compressed in the fuel pump 140 first, and the pressure of the liquid fuel is not increased. Therefore, an injector coupled to the fuel pump 140 may not be able to jet out the fuel. In particular, in the idling state, since the speed of flow of fuel that passes through the fuel hose 142 is low, the quantity of air bubbles that are produced is increased.

Therefore, the engine system 100 of the embodiment includes a cooling device 200 that cools the inside of the surrounding member 150 (the engine E). The cooling device 200 is described in detail below.

Cooling Device 200

As illustrated in FIG. 1, the cooling device 200 includes the surrounding member 150, a suction pipe 230, a coupling pipe 240, and a flow-path-formation mechanism 250, and has an air inlet 210 and an air outlet 220.

The air inlet 210 and the air outlet 220 are formed in the surrounding member 150. The air inlet 210 is formed below the air outlet 220 in a vertical direction. The air inlet 210 and the air outlet 220 are positioned in the surrounding member 150 at locations substantially on a diagonal.

One end of the suction pipe 230 has an opening 232, and the air inlet 210 is coupled to the other end of the suction pipe 230. The opening 232 faces the front side of the vehicle 10. The inside diameter (pipe diameter) of the suction pipe 230 is smaller than the inside diameter of the intake pipe 130.

The coupling pipe 240 couples the intake pipe 130 and the air outlet 220 to each other. In the embodiment, the coupling pipe 240 is coupled between the outside-air inlet 130a of the intake pipe 130 and the air cleaner 134 in the intake pipe 130. In other words, the coupling pipe 240 is coupled on an upstream side with respect to the air cleaner 134 in the intake pipe 130. The inside diameter (pipe diameter) of the coupling pipe 240 is smaller than the inside diameter of the intake pipe 130.

When the temperature inside the surrounding member 150 is greater than or equal to a predetermined temperature, the flow-path-formation mechanism 250 forms a flow path that allows outside air to circulate to the air outlet 220 from the air inlet 210. In the embodiment, the flow-path-formation mechanism 250 includes a valve 252 and a controller 254. The valve 252 is provided between the outside-air inlet 130a and a coupling portion of the intake pipe 130 with the coupling pipe 240. In other words, the valve 252 is disposed closer than the coupling portion of the intake pipe 130 with the coupling pipe 240 (a coupling portion with the air outlet 220) to an upstream side. The valve 252 opens and closes a flow path on an upstream side with respect to the coupling pipe 240 at the intake pipe 130.

The ECU 110 serves as the controller 254 when the opening and the closing of the valve 252 is to be controlled. In accordance with the temperature inside the surrounding member 150, the controller 254 performs switching control on the valve 252 to set an open state in which the intake pipe 130 is open and a closed state in which the intake pipe 130 is closed. The temperature inside the surrounding member 150 is measured by a temperature sensor provided at the ECU 110. The switching control performed on the valve 252 by the controller 254 is described below.

Figure 2:
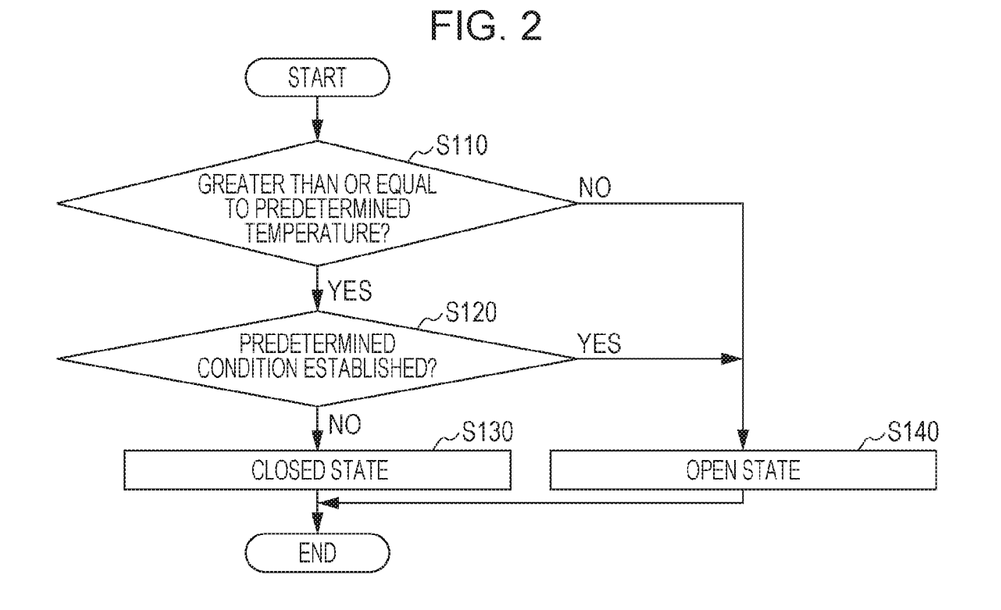
FIG. 2 is a flowchart of a switching control process performed on a valve by a switching controller.

FIG. 2 is a flowchart of a switching control process performed on the valve 252 by the controller 254. As illustrated in FIG. 2, the switching control process includes a temperature determination step S110, a condition determination step S120, a closed-state switching step S130, and an open-state switching step S140. In the embodiment, the switching control process is repeatedly performed due to an interruption occurring at a predetermined time interval.

Temperature Determination Step S110

The controller 254 determines whether the temperature inside the surrounding member 150 is greater than or equal to the predetermined temperature. The predetermined temperature is determined based on either one or both of a heat resistance temperature of the components that constitute the engine E and an upper limit of a temperature that allows the pressure of a liquid fuel to be increased by the fuel pump 140, and is, for instance, 95° C. If the controller 254 determines that the temperature inside the surrounding member 150 is greater than or equal to the predetermined temperature (YES in step S110), the controller 254 causes the switching control process to proceed to the condition determination step S120. In contrast, if the controller 254 determines that the temperature inside the surrounding member 150 is less than the predetermined temperature (NO in step S110), the controller 254 causes the switching control process to proceed to the open-state switching step S140.

Condition Determination Step S120

The controller 254 determines whether a predetermined condition is established. The predetermined condition refers to a condition in which the engine E is driven at a driving region with an output greater than or equal to a predetermined output (for instance, a driving region including an uphill road). If the controller 254 determines that the predetermined condition is not established (NO in step S120), the controller 254 causes the switching control process to proceed to the closed-state switching step S130. In contrast, if the controller 254 determines that the predetermined condition is satisfied (YES in step S120), the controller 254 causes the switching control process to proceed to the open-state switching step S140.

Closed-State Switching Step S130

If the valve 252 is the open state, the controller 254 switches the open state to the closed state and ends the switching control process. If the valve 252 is the closed state, the controller 254 maintains the closed state and ends the switching control process.

Figure 3:
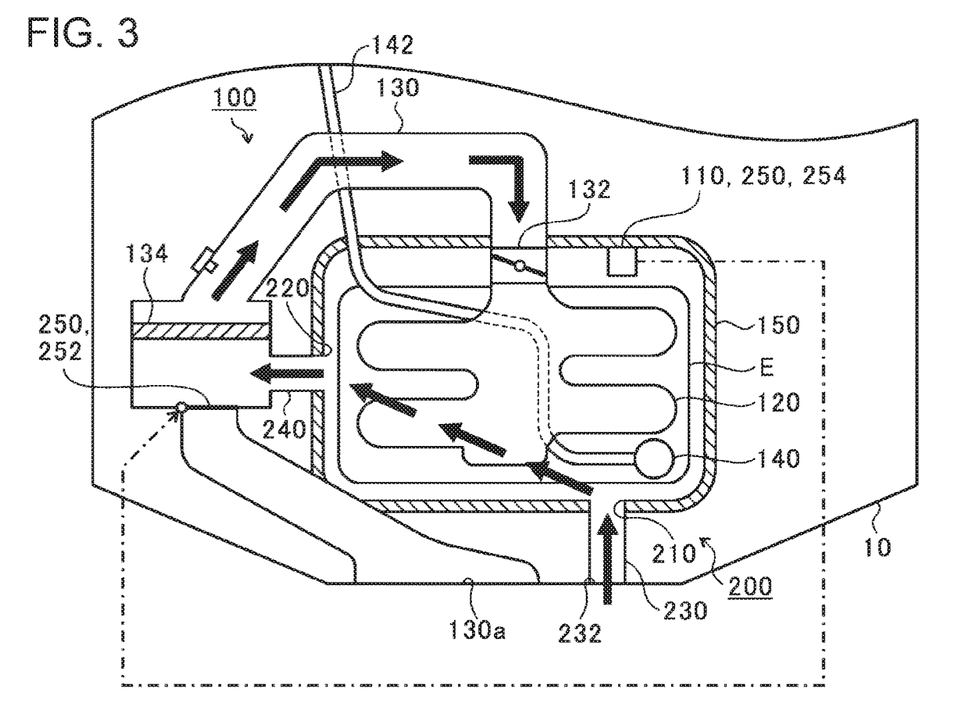
FIG. 3 illustrates a flow of outside air when the valve is in a closed state.

FIG. 3 illustrates a flow of outside air when the valve 252 is in the closed state. In FIG. 3, the arrows indicate the flow of outside air. As illustrated in FIG. 3, the closed state is a state in which the valve 252 closes a flow path that is formed in the intake pipe 130.

When the controller 254 switches the valve 252 to the closed state, negative intake pressure produced by the engine E allows the outside air to be introduced from the opening 232. The introduced outside air is guided into the surrounding member 150 via the suction pipe 230 and the air inlet 210. The outside air passes inside the surrounding member 150 and is guided to a downstream side with respect to the valve 252 in the intake pipe 130 via the air outlet 220 and the coupling pipe 240. During the passage of the outside air, heat is exchanged between the outside air and the engine E accommodated in the surrounding member 150, and, thus, the engine E is cooled and the outside air is heated. Then, after the outside air guided to the intake pipe 130 has passed through the air cleaner 134, the outside air is guided to the combustion chamber of the engine E via the throttle valve 132 and the intake manifold 120.

Open-State Switching Step S140

Returning to FIG. 2 to describe the switching control process, if the valve 252 is in the closed state, the controller 254 switches the closed state to the open state and ends the switching control process. If the valve 252 is in the open state, the controller 254 maintains the open state and ends the switching control process.

Figure 4:
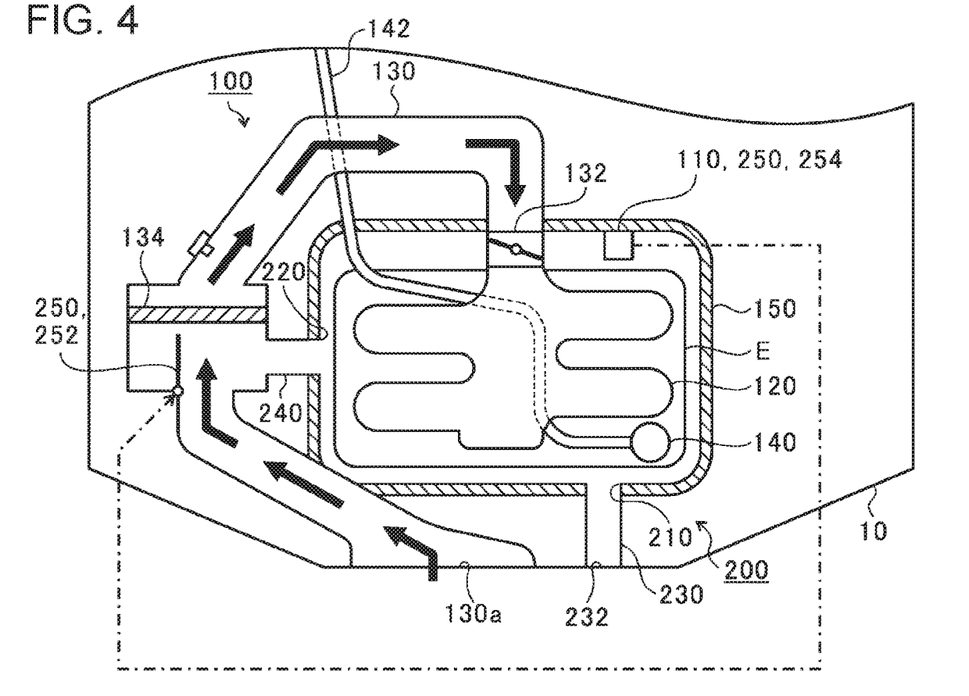
FIG. 4 illustrates a flow of outside air when the valve is an open state.

FIG. 4 illustrates a flow of outside air when the valve 252 is the open state. In FIG. 4, the arrows indicate the flow of outside air. As illustrated in FIG. 4, the open state is a state in which the valve 252 opens the flow path that is formed in the intake pipe 130. When the controller 254 switches the valve 252 to the open state, negative intake pressure produced by the engine E allows the outside air to be introduced into the intake pipe 130 from the outside-air inlet 130a. Then, after the introduced outside air has passed through the air cleaner 134, the outside air is guided to the combustion chamber of the engine E via the throttle valve 132 and the intake manifold 120.

In the open state, since the air inlet 210 (the opening 232) and the intake pipe 130 communicate with each other, the outside air is guided into the surrounding member 150 via the opening 232. However, since pressure loss inside the surrounding member 150 is larger than pressure loss in the intake pipe 130, the outside air is primarily guided to the intake pipe 130 from the outside-air inlet 130a. In other words, the outside air is almost never guided into the surrounding member 150.

As described above, the cooling device 200 according to the embodiment has the air outlet 220, formed in the surrounding member 150, and includes the valve 252. Therefore, in the cooling device 200, when the temperature inside the surrounding member 150 is greater than or equal to the predetermined temperature, and the valve 252 is in the closed state, negative intake pressure produced by the engine E allows the outside air to circulate to the air outlet 220 from the air inlet 210. Therefore, as long as the engine E is driven, even in the idling state, the cooling device 200 is capable of cooling the engine E accommodated in the surrounding member 150 with the outside air.

Consequently, the cooling device 200 makes it possible to decrease the likelihood of the components of the engine E deteriorating due to heat or being damaged. The cooling device 200 makes it possible to decrease the likelihood of fuel in the surrounding member 150 evaporating. Thus, the cooling device 200 makes it possible to increase the pressure of liquid fuel by the fuel pump 140 and to decrease the likelihood of fuel no longer being jetted out by the injector.

Since the outside air can be circulated by using negative intake pressure produced by the engine E, it is possible not to use, in the cooling device 200, a dedicated device (fan, blower) used to circulate the outside air to the surrounding member 150. Therefore, it is possible to reduce the number of components, facility costs, and running costs of the cooling device 200.

By using a simple structure in which the valve 252 is switched to the open state and the closed state, the cooling device 200 makes it possible to circulate the outside air to the surrounding member 150 and to decrease the likelihood of the outside air circulating to the surrounding member 150.

Regardless of the open state or the closed state of the valve 252, the cooling device 200 is capable of, after allowing outside air to pass through the air cleaner 134, guiding the outside air to the combustion chamber. Therefore, it is possible to decrease the likelihood of dust being guided to the combustion chamber.

As described above, the air inlet 210 of the cooling device 200 is formed below the air outlet 220 in the vertical direction. High-temperature gas rises because the density of high-temperature gas is lower than the density of low-temperature gas. Therefore, the cooling device 200 is capable of smoothly guiding high-temperature outside air to the air inlet 210. Consequently, the cooling device 200 is capable of efficiently cooling the engine E.

As described above, the air inlet 210 and the air outlet 220 of the cooling device 200 are positioned in the surrounding member 150 at locations substantially on a diagonal. Consequently, the cooling device 200 makes it possible to increase the length of a flow path in which outside air circulates in the surrounding member 150 and to efficiently cool the engine E.

Even if the temperature of the surrounding member 150 is greater than or equal to the predetermined temperature, when the engine E is driven with an output greater than or equal to the predetermined output, the valve 252 of the cooling device 200 is set in the open state. Therefore, in the cooling device 200, outside air that has been heated as a result of circulating in the surrounding member 150 is less likely to be introduced into the intake manifold 120.

In other words, in the cooling device 200, heat is not exchanged and, substantially, outside air having an outside air temperature can be efficiently guided to the intake manifold 120. Consequently, compared to when the valve 252 is in the closed state, the cooling device 200 makes it possible to increase the amount of oxygen per unit flow rate that is guided to the intake manifold 120 (the combustion chamber) and to maintain the output of the engine E with an output greater than or equal to a predetermined value.

Modification

Figure 5:
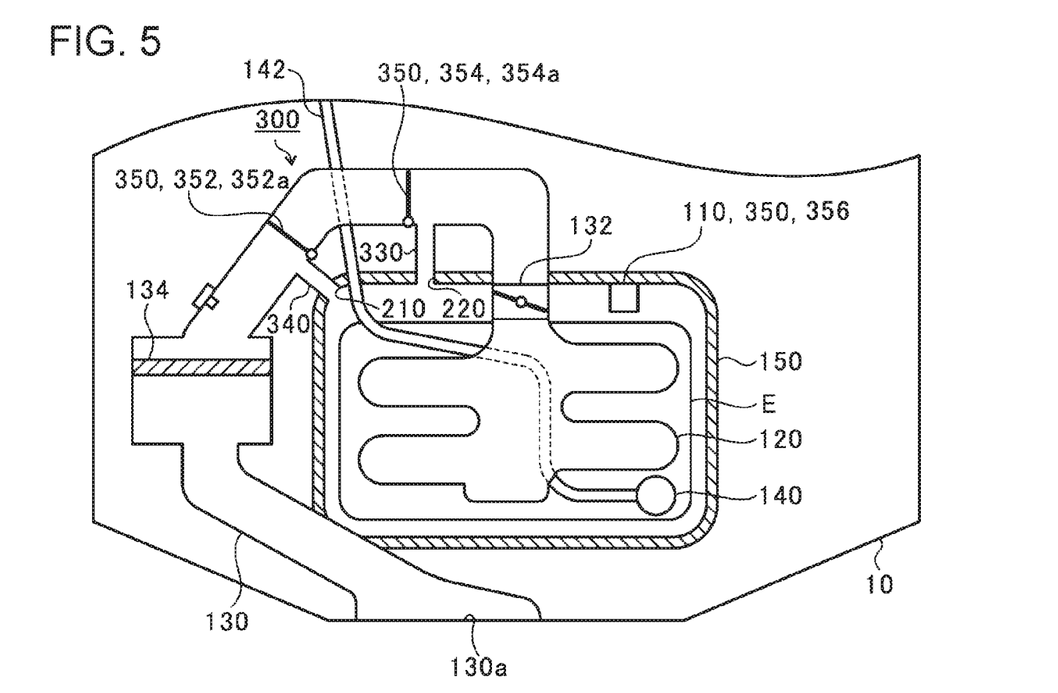
FIG. 5 illustrates a cooling device according to a modification.

FIG. 5 illustrates a cooling device 300 according to a modification. As illustrated in FIG. 5, the cooling device 300 includes a surrounding member 150, coupling pipes 330 and 340, and a flow-path-formation mechanism 350, and has an air inlet 210 and an air outlet 220. Structural components that are substantially the same as those of the cooling device 200 are given the same reference signs and are not described.

The coupling pipe 330 couples the intake pipe 130 and the air outlet 220 to each other. In the modification, the coupling pipe 330 is coupled between the air cleaner 134 and the throttle valve 132 in the intake pipe 130. In other words, the coupling pipe 330 is coupled on a downstream side with respect to the air cleaner 134 in the intake pipe 130. The inside diameter (pipe diameter) of the coupling pipe 330 is smaller than the inside diameter of the intake pipe 130.

The coupling pipe 340 couples the air inlet 210 and the intake pipe 130 to each other. The coupling pipe 340 is coupled between the air cleaner 134 in the intake pipe 130 and a coupling portion of the intake pipe 130 with the coupling pipe 330.

When the temperature inside the surrounding member 150 is greater than or equal to the predetermined temperature, the flow-path-formation mechanism 350 forms a flow path that allows outside air to circulate to the air outlet 220 from the air inlet 210. In the modification, the flow-path-formation mechanism 350 includes a first valve 352, a second valve 354, and a controller 356.

The first valve 352 includes a first valve body 352a. The first valve body 352a is provided between the intake pipe 130 and the air inlet 210. In the modification, the first valve body 352a is provided between the coupling portion of the intake pipe 130 with the coupling pipe 330 and a coupling portion of the intake pipe 130 with the coupling pipe 340. The first valve body 352a is switched to a first direct state or a first bypass state by the controller 356 described below. The first direct state is a state in which a passage of the intake pipe 130 is open and the air inlet 210 (a passage of the coupling pipe 340) is closed. The first bypass state is a state in which a downstream side of the coupling portion of the intake pipe 130 with the coupling pipe 340 is closed and the air inlet 210 (the passage of the coupling pipe 340) is open. That is, the first bypass state is a state in which the passage of the intake pipe 130 and the air inlet 210 communicate with each other. The first valve body 352a has an area that is greater than or equal to a flow-path sectional area of the coupling pipe 340.

The second valve 354 includes a second valve body 354a. The second valve body 354a is provided between the intake pipe 130 and the air outlet 220. In the modification, the second valve body 354a is provided between the coupling portion of the intake pipe 130 with the coupling pipe 330 and the coupling portion of the intake pipe 130 with the coupling pipe 340, and is provided closer than the first valve body 352a to the coupling pipe 330. The second valve body 354a is switched to a second direct state or to a second bypass state by the controller 356. The second direct state is a state in which the intake pipe 130 is open and the air outlet 220 (a passage of the coupling pipe 330) is closed. The second bypass state is a state in which an upstream side of the coupling portion of the intake pipe 130 with the coupling pipe 330 is closed and the air outlet 220 (the passage of the coupling pipe 330) is open. That is, the second bypass state is a state in which the intake pipe 130 and the air outlet 220 communicate with each other. The second valve body 354a has an area that is greater than or equal to a flow-path sectional area of the coupling pipe 330.

When an ECU 110 controls the first valve 352 and the second valve 354, the ECU 110 serves as the controller 356. In accordance with the temperature inside the surrounding member 150, the controller 356 performs switching control on the first valve 352 and the second valve 354.

For example, if the temperature inside the surrounding member 150 is greater than or equal to the predetermined temperature and the predetermined condition is not established, the controller 356 switches the first valve body 352a to the first bypass state and the second valve body 354a to the second bypass state.

Figure 6:
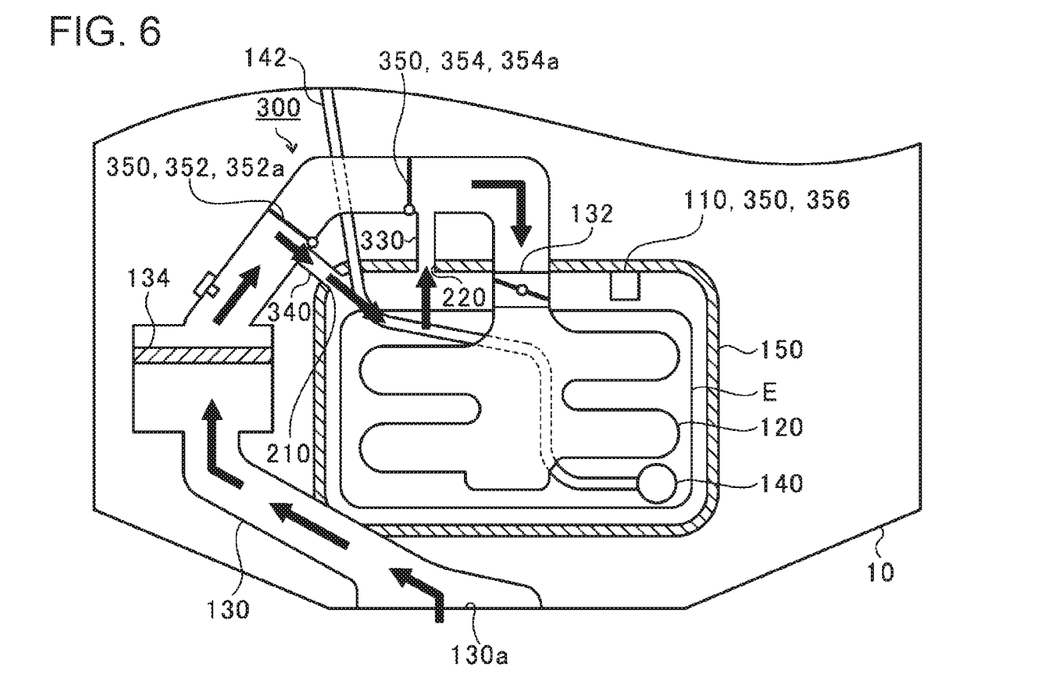
FIG. 6 illustrates a flow of outside air when states have been switched to a first bypass state and a second bypass state.

FIG. 6 illustrates a flow of outside air when states have been switched to the first bypass state and the second bypass state. In FIG. 6, the arrows indicate the flow of outside air. When the controller 356 switches the first valve body 352a to the first bypass state and the second valve body 354a to the second bypass state, negative intake pressure produced by the engine E causes the outside air to be introduced from the outside-air inlet 130a. The introduced outside air is guided into the surrounding member 150 via the intake pipe 130, the coupling pipe 340, and the air inlet 210. The outside air passes inside the surrounding member 150 and is guided again to the intake pipe 130 via the air outlet 220 and the coupling pipe 330. During the passage of the outside air, heat is exchanged between the outside air and the engine E accommodated in the surrounding member 150, and, thus, the engine E is cooled and the outside air is heated. Then, the outside air that has been guided to the intake pipe 130 is guided to the combustion chamber of the engine E via the throttle valve 132 and the intake manifold 120.

In contrast, if the temperature inside the surrounding member 150 is less than the predetermined temperature, or if the predetermined condition is established even though the temperature inside the surrounding member 150 is greater than or equal to the predetermined temperature, the controller 356 switches the first valve body 352a to the first direct state and the second valve body 354a to the second direct state.

Figure 7:
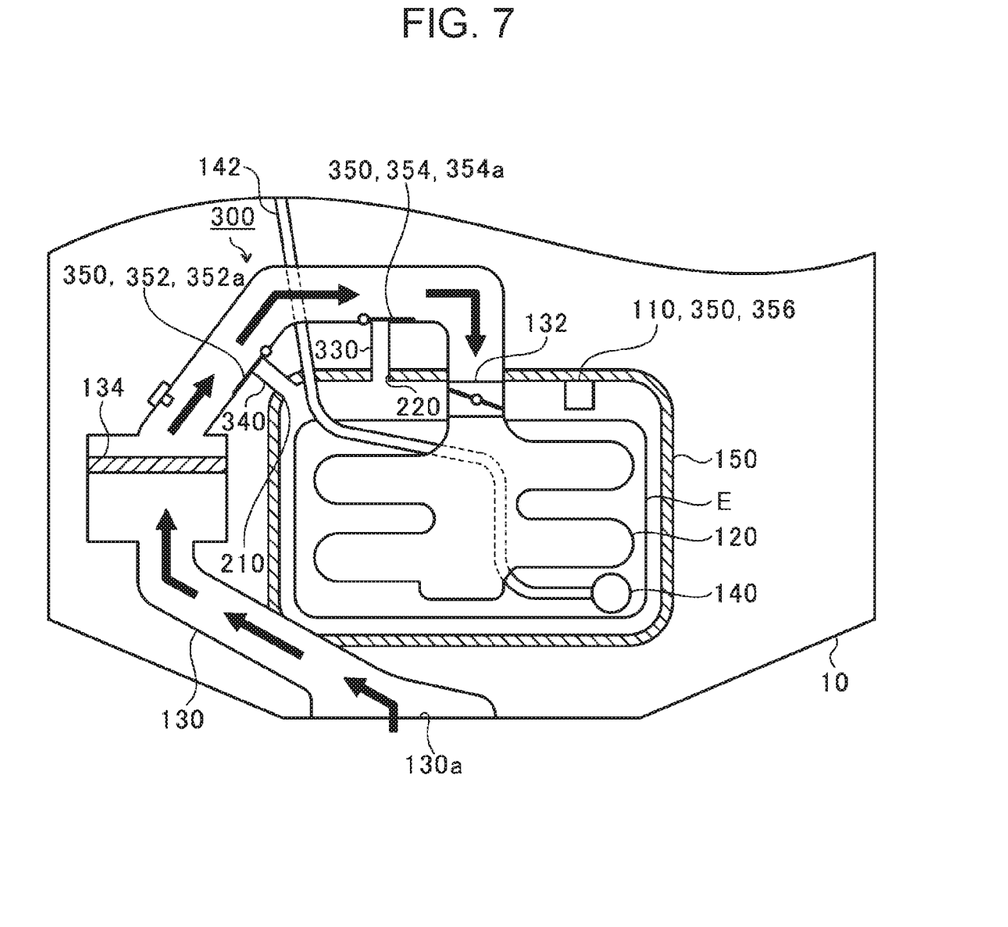
FIG. 7 illustrates a flow of outside air when states have been switched to a first direct state and to a second direct state.

FIG. 7 illustrates a flow of outside air when states have been switched to the first direct state and to the second direct state. In FIG. 7, the arrows indicate the flow of outside air. When the controller 356 switches the first valve body 352a to the first direct state and the second valve body 354a to the second direct state, negative intake pressure produced by the engine E causes the outside air to be introduced into the intake pipe 130 from the outside-air inlet 130a. The introduced outside air, after passing through the air cleaner 134, is guided to the combustion chamber of the engine E via the throttle valve 132 and the intake manifold 120.

As described above, in the cooling device 300 according to the modification, with the first valve body 352a in the first bypass state and the second valve body 354a in the second bypass state, the negative intake pressure produced by the engine E can allow the outside air to circulate to the air outlet 220 from the air inlet 210. Therefore, as long as the engine E is driven, even in the idling state, the cooling device 300 is capable of cooling the engine E accommodated in the surrounding member 150 with the outside air.

Although an embodiment of the disclosure has been described above with reference to the attached drawings, needless to say, the embodiment of the disclosure is not limited to such an embodiment. It is obvious that any person skilled in the art can arrive at various exemplary changes and modifications within the category described in the scope of the claims, and such changes and modifications are understood to naturally belong to the technical scope of the embodiment of the disclosure.

In the embodiment and the modification above, the cooling device 200 and the cooling device 300 have been described by using, respectively, the structure in which switching control is performed on the flow-path-formation mechanism 250 based on the temperature inside the surrounding member 150 and the structure in which switching control is performed on the flow-path-formation mechanism 350 based on the temperature inside the surrounding member 150. However, the cooling device 200 may have a structure in which switching control is performed on the flow-path-formation mechanism 250 based on the temperature of the engine E, and the cooling device 300 may have a structure in which switching control is performed on the flow-path-formation mechanism 350 based on the temperature of the engine E.

In the embodiment and the modification above, the cooling device 200 and the cooling device 300 have been described by using the structure in which the temperature inside the surrounding member 150 is measured with the temperature sensor provided at the ECU 110. However, as long as the temperature inside the surrounding member 150 or the temperature of the engine E can be measured or estimated, such a structure is not limited to a measuring device. For instance, in the cooling device 200 and the cooling device 300, the temperature inside the surrounding member 150 or the temperature of the engine E may be estimated based on a detection value of an air flow sensor provided between the air cleaner 134 and the throttle valve 132 in the intake pipe 130. Alternatively, in the cooling device 200 and the cooling device 300, the temperature inside the surrounding member 150 or the temperature of the engine E may be estimated based on the idling state time, the temperature of cooling water, or the temperature of a lubricant.

In the embodiment above, for instance, the cooling device 200 includes the suction pipe 230. However, a structure in which the cooling device 200 does not include a suction pipe 230 may be used.

The cooling device 200 may further include a valve that opens and closes the air inlet 210 (or the flow path in the suction pipe 230). When the valve 252 is in the closed state, this valve opens the air inlet 210, and when the valve 252 is in the open state, this valve closes the air inlet 210.

In the embodiment above, for instance, the air inlet 210 of the cooling device 200 is formed below the air outlet 220 in the vertical direction. However, the position of the air inlet 210 in the vertical direction may be the same as the position of the air outlet 220 in the vertical direction, or the air inlet 210 may be formed above the air outlet 220 in the vertical direction.

In the embodiment above, for instance, the air inlet 210 and the air outlet 220 of the cooling device 200 are positioned in the surrounding member 150 at locations substantially on a diagonal. However, a structure in which the air inlet 210 and the air outlet 220 are not positioned on a diagonal may be used.

The invention claimed is:

1. A cooling device comprising:
   a surrounding member configured to surround an engine;
   an air inlet that is formed in the surrounding member;
   an air outlet that is formed in the surrounding member and that is to be coupled to an intake pipe of the engine, wherein the air inlet is coupled intake pipe and wherein the air inlet and the air outlet are coupled between an air cleaner and a throttle valve in the intake pipe; and
   a flow-path-formation mechanism configured to form a flow path that allows outside air to circulate to the air outlet from the air inlet when a temperature of the engine or a temperature inside the surrounding member is greater than or equal to a predetermined temperature, wherein
   a first valve body disposed between the intake pipe and the air inlet;
   a second valve body disposed between the intake pipe and the air outlet; and
   a controller configured to:
      control the first valve body to close the air inlet and configured to control the second valve body to close the air outlet when the temperature of the engine or the temperature inside the surrounding member is less than the predetermined temperature, and
      control the first valve body to cause the intake pipe and the air inlet to communicate with each other and configured to control the second valve body to cause the intake pipe and the air outlet to communicate with each other when the temperature of the engine or the temperature inside the surrounding member is greater than or equal to the predetermined temperature.

2. The cooling device according to claim 1, wherein the air outlet is coupled on an upstream side with respect to an air cleaner in the intake pipe.

3. The cooling device according to claim 2, wherein the flow-path-formation mechanism comprises a valve disposed closer to an upstream side than a coupling portion of the intake pipe with the air outlet.

* * * * *